Figure 1:
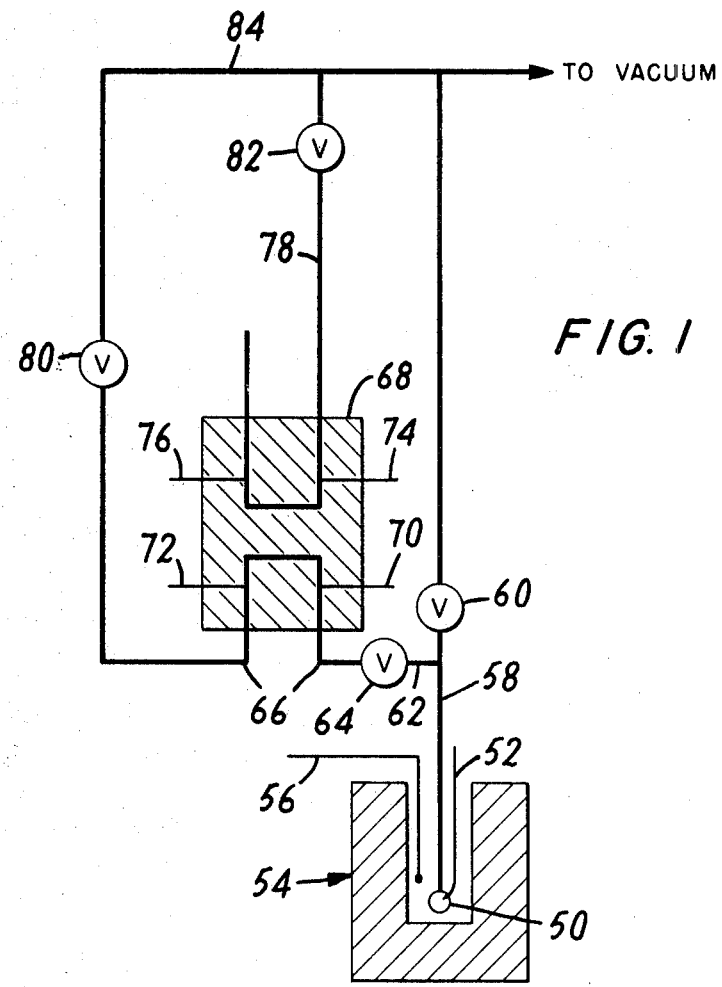

United States Patent

[11] 3,589,172

| [72] | Inventor | Robert S. Bowman<br>Pittsburgh, Pa. |
|---|---|---|
| [21] | Appl. No. | 608,743 |
| [22] | Filed | Jan. 12, 1967 |
| [45] | Patented | June 29, 1971 |
| [73] | Assignee | St. Joseph Lead Company<br>New York, N.Y. |

[54] METHOD AND APPARATUS FOR CHARACTERIZING MATERIALS
13 Claims, 6 Drawing Figs.

| [52] | U.S. Cl. | 73/25, 73/19 |
|---|---|---|
| [51] | Int. Cl. | G01m 1/00 |
| [50] | Field of Search | 73/19, 25 |

[56] References Cited
UNITED STATES PATENTS

| 3,177,700 | 4/1965 | Sier | 73/19 |
|---|---|---|---|
| 2,387,878 | 10/1945 | Brown | 73/19 |
| 2,656,256 | 10/1953 | Yeater | 73/25 |
| 3,222,133 | 12/1965 | Ballou et al. | 73/19 |

Primary Examiner—Richard C. Queisser
Assistant Examiner—John K. Lunsford
Attorney—Brumbaugh, Free, Graves & Donohue ABSTRACT: A novel process for characterizing compositions of matter is described in which a sample of the unknown material is heated and the rate of gas evolution from the sample is measured. Comparison of the temperature-gas evolution rates or profiles of the unknown material with the rates or profiles obtained from known materials provides identification of the unknown. Apparatus for carrying out the process is also described.

3,589,172

PATENTED JUN 29 1971

SHEET 1 OF 2

INVENTOR.
ROBERT S. BOWMAN

BY Brumbaugh, Free, Graves and Donohue his ATTORNEYS

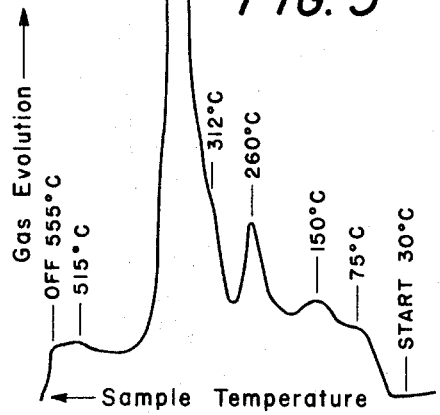

FIG. 3
CONTINUOUS DESORPTION CURVE
FOR FRENCH PROCESS ZINC OXIDE
(8.1 m²/g)
200 mg Sample

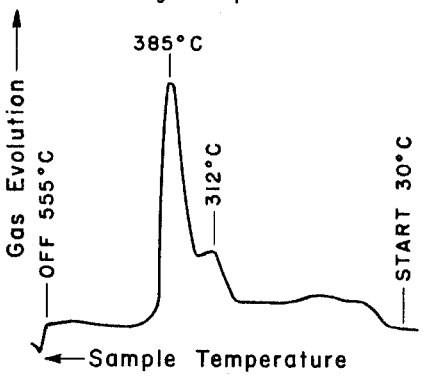

FIG. 4
CONTINUOUS DESORPTION CURVE
FOR FRENCH PROCESS ZINC OXIDE
(3.1 m²/g)
200 mg Sample FIG. 5
CONTINUOUS DESORPTION CURVE
FOR AMERICAN PROCESS ZINC OXIDE
(9.1 m²/g)
200 mg Sample

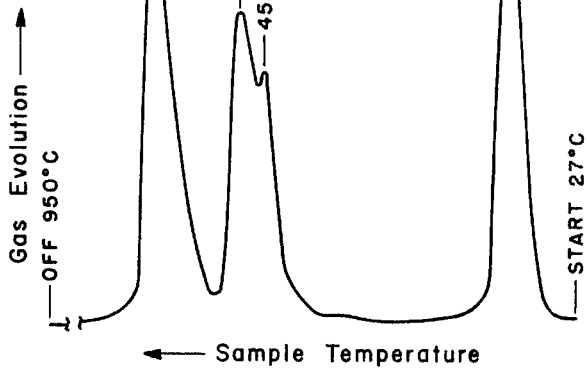

FIG. 6
THERMAL DECOMPOSITION OF
CALCIUM OXALATE MONOHYDRATE
0.6 mg Sample

INVENTOR.
ROBERT S. BOWMAN
BY
Brumbaugh, Free, Graves and Donohue
his ATTORNEYS

METHOD AND APPARATUS FOR CHARACTERIZING MATERIALS

The need for apparatus and methods which are capable of characterizing and identifying materials is manifest. Of particular importance to the present invention are methods and apparatus which are capable of identifying surface characteristics of solids. Surface characteristics are of importance in adsorption and desorption phenomena and, it has been found in the present invention, are a useful means for detecting differences in the treatment to which materials appearing nominally the same in chemical composition have been subjected.

In accordance with the present invention, a novel method and apparatus have been discovered which are capable of characterizing materials which undergo desorption or decomposition phenomena within the temperature range of $t_1$ to $t_2$; $t_1$ being less than $t_2$. The invention is characterized by the step of measuring the rate at which the desorption and/or decomposition phenomena occur as a function of temperature as the temperature of the test sample is steadily increased within the temperature range $t_1$ to $t_2$. In carrying out the present invention using the preferred apparatus described hereinafter, only an exceptionally small amount of sample is required.

Briefly summarized, the present invention is characterized by the following steps:

1. subjecting a sample of the material whose desorption or decomposition characteristics are to be measured to a high vacuum, of at least below 0.1 mm. Hg., at a temperature which is at or below the temperature $t_1$ referred to above for a period of time sufficient to remove extraneous gases from the solids;

2. heating the sample while it is maintained under vacuum to a temperature above $t_2$ at a substantially constant rate, whereby gases are evolved; and 3. measuring the rate of gas evolution or the quantity thereof evolved at one or more times during the heating process, and the temperature at which the measurement is observed.

Figure 2:
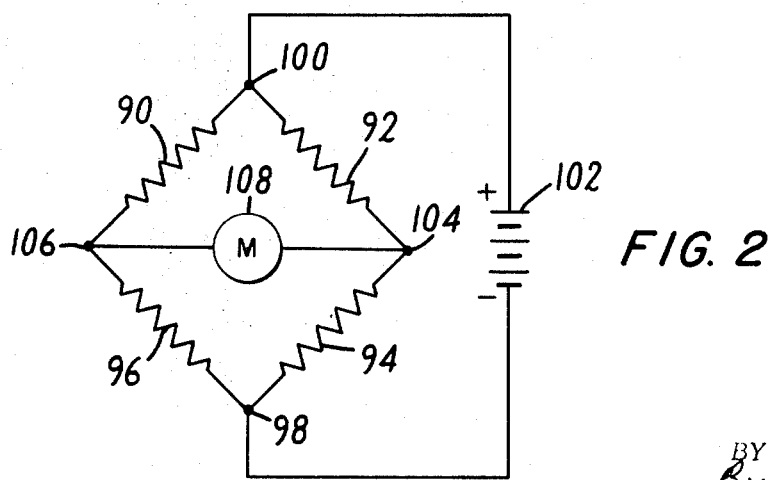

The present invention may be more fully understood by reference to the accompanying figures illustrating typical apparatus adapted for the practice thereof and typical characteristic desorption curves in which:

FIGS. 1 and 2 show schematic diagrams of a preferred apparatus for carrying out the process of the present invention; and FIGS. 3—6 are typical temperature-desorption curves obtained when using the apparatus of FIG. 1.

A preferred apparatus for this purpose is schematically illustrated in FIG. 1. In the apparatus illustrated in FIG. 1, a sample bulb 50 is provided having a thermocouple 52 mounted therein and recording for observing and recording the temperature of the sample contained in sample bulb 50. The entire assembly is mounted within a furnace 54. An additional thermocouple 56 is provided in furnace 54 by means of which the furnace 54 may be automatically controlled to heat the sample at a substantially linear rate. The apparatus illustrated functions well when using samples in order of 0.5 to 500 mg. For such samples, heating rates between about 5° and 10° per minute are particularly preferred.

Extending from the sample bulb 50 is a tube 58 which terminates in a stopcock 60 and has a "T" connection 62 terminated by a stopcock 64. Tube 66 extends beyond stopcock 64 and passes through one portion of thermal conductivity cell 68. Mounted within tube 66 and within the thermal conductivity block 68 are two hot wire gas flow detectors 70 and 72, respectively, having a pair of electrical terminals (i.e. each of 70 and 72 represents a hot wire gas flow detector and the pair of terminals therewith). Mounted adjacent the hot wire gas flow detectors 70 and 72 within the conductivity block 68 are two further hot wire gas flow detectors 74 and 76 and the terminal pairs associated with each. Gas flow detectors 74 and 76 are mounted within tube 78 through which no gas flow normally occurs but which may be brought to substantially the same pressure as the opposing cells surrounding detectors 70 and 72. Accordingly, the flow detectors 74 and 76 function as reference cells. The reference detectors 74 and 76 are wired together with the measuring detectors 70 and 72 into a conventional Wheatstone bridge circuit.

The hot wires 70, 72, 74 and 76 of the thermal conductivity block 68 are of a design which is conventional in the art. As is well known, these wires are then filaments, normally of tungsten, which are mounted between two supporting electrical conductors extending into the gas flow path. Semiconductor devices such as thermistors may also be used. The wires are electrically heated by a small current, so that they normally assume a temperature above that of the cell block 68.

In one typical embodiment, the filaments are heated by means of a constant current. If the heat transfer coefficient from the filaments 70 and 72 to the surrounding gases in their associated cells is greater than the corresponding heat transfer coefficient from detectors 74 and 76, due to a change in pressure, gas composition or flow rate, the filaments 70 and 72 will become cooler. In the very high vacuums normally used in the present apparatus, the effect of pressure on heat transfer normally will exert the predominant influence on the temperature of the filaments 70 and 72. Liberation of gases by the sample causes a slight rise in the pressure and a flow of gas in the cells associated with the filaments 70 and 72 relative to the cells associated with the filaments 74 and 76. The increase in pressure is a function of the instantaneous flow rate of gases through the measuring cell. Accordingly, filaments 70 and 72 which are cooled by the combined pressure and velocity effects of the evolved gases will have a lower resistance than filaments 74 and 76 and this difference in resistance accords a basis for measuring the instantaneous flow rate of gas through tube 66 which surrounds the filaments 70 and 72.

Tubes 66 and 78 terminate in stopcocks 80 and 82 respectively, and extending beyond stopcocks 80 and 82, as well as extending beyond stopcock 60, is manifold 84 which is connected to a vacuum pump (not shown) by means of which the entire apparatus can be evacuated to a pressure normally below about 0.1 mm. of mercury. Preferably, the process is carried out at pressure of $10^{12}$mm. to $10^{14}$mm. Hg. (absolute).

FIG. 2 illustrates schematically the electrical circuit which is utilized in the foregoing. As may be seen, the four hot wire tungsten filaments (designated in FIG. 2 as 90, 92, 94 and 96) are arranged in a bridge circuit. Across two of the opposing terminals 98 and 100 of the bridge circuit, there is provided a constant current source 102 for heating the tungsten filaments while across the other two opposing terminals 104 and 106 of the bridge circuit, a meter 108, such as a recording millivolt meter, is provided. Filaments 92 and 96 are mounted in the flow path on the detector side of the cell while the filaments 90 and 94 are mounted in the reference side of the cell. The presence of a gas flow through the detector side of the cell containing filaments 92 and 96 will cause these filaments to cool and their resistance, accordingly, to decrease. This will cause the potential at terminal 104 to increase and the potential at terminal 106 to decrease. The resulting voltage difference is measured on meter 108, and reflects the rate at which gas flows past the detector filaments.

A wide variety of modifications of the basic technique for measuring the flow rate of gases will be apparent to those skilled in the art. All such devices are equivalent to the above-described technique and are to be included in the present invention. In some cases, the measuring means may be sensitive to the instantaneous flow rate, while in other cases means may be employed which measure an average flow rate over a finite time interval. An illustration of the latter would be a measurement of the total amount of gas liberated over a known time interval divided by the time of measurement. By contrast, the thermal conductivity cell employed as described above provides a direct measurement of the instantaneous flow rate therethrough. Many other mechanical flow rate measuring devices are well known for use under moderate vacuums.

As an alternative to measuring gas flow rate, means may be provided for measuring the total or cumulative amount of gases evolved. Typically these might be accomplished by allowing the liberated gas to accumulate in a suitable reservoir and measuring pressure changes, or in a suitable buret maintained at a constant pressure and measuring volume changes.

It may be more convenient to accomplish the result by employing a suitable instantaneous rate measuring instrument, such as the hot wire instrument described in the preferred embodiment, and combining the output thereof with suitable electronic or mechanical integrating means.

The operation of the above-described embodiment of this invention is illustrated by the following:

A 200 milligram sample of zinc oxide having a surface area of 8.1 m²/g is placed in sample bulb 50. The bulb, together with the sample contained therein is degassed for several minutes at substantially room temperature by means of tube 58 and stopcock 60. Stopcocks 64, 80 and 82 are closed. This initial degassing avoids exposure of the hot wire filaments 70 and 72 to excessive surges of gas flow.

After the sample has been degassed, stopcock 60 is closed, and stopcocks 80 and 82 are opened to allow the balance of the system to be evacuated. After the system has been substantially uniformly evacuated, stopcock 64 is opened. After room temperature outgassing has provided a steady base line of the recorded signal from the bridge circuit, indicating that the sample has reached substantial equilibrium at the temperature and vacuum conditions within the sample bulb, the temperature programmer controlling the furnace 54 is activated and the sample is heated at a rate of about 5° C./min. over the desired temperature range, the heating rate being substantially constant. Typically from about one-fourth to 1 hour is required to obtain a steady base line; however, in some cases longer or shorter degassing periods will be appropriate.

The resulting desorption curve obtained is shown in FIG. 3. The peaks represent temperatures at which there was an increase flow of desorbed gases from the sample. A 385° peak, in particular, has been found to be typical of commercial zinc oxides. This peak represents a desorption of rather strongly bonded (i.e. chemisorbed) surface water. The size of the peak has been found to vary with the total surface area. Thus, a 200 milligram sample of a lower area (3.1 m.²/g.) commercial zinc oxide yields the desorption pattern illustrated in FIG. 4. The presence of a 312° desorption peak typical of commercial French process zinc oxide is absent in the sample of a commercial American process zinc oxide (FIG. 5).

While the sample heating may be manually controlled, if desired, it is by far preferred to use an automatic controlling apparatus which will continuously adjust the heating rate of the furnace so that the rate at which the sample is heated will remain essentially constant throughout the measurements.

As will become apparent, the measurement of desorption and decomposition characteristics in accordance with the present invention is carried out in a dynamic system—that is, the characteristic curves reflect gas evolution rates, as distinguished from equilibria, as a function of temperature. Because the dynamics of the process are a function of the rate of heating of the sample, it is important in carrying out the present invention to heat the sample at a substantially constant rate (i.e. in accordance with the equation $t=a\theta$ where $t$ is temperature and $\theta$ is time). Simple heating of a furnace, as will result for example by providing for a constant power input, will yield a rate of heating which continually decreases as the furnace temperature increases. Variations in the rate of heating of this nature tend to cause untoward variations in the base line and to introduce spurious peaks in the resulting rate-temperature measurements.

In a simple embodiment of the present invention, the heating rate may be manually controlled by means of a variable transformer which can be adjusted to increase the power input to the furnace as the temperature increases thereby making it possible to approximate a linear heating rate. In this simple embodiment, however, extreme care must be exercised in controlling the rate of heating since sudden and excessive changes in the heating rate may be even more detrimental from the standpoint of obtaining meaningful results than a steady drift in the base line. For this reason, in order to make the best possible measurements, it is by far preferred to employ an automatic temperature controlling means which may be programmed to heat the furnace at a constant rate. Programmers capable of maintaining a heating rate substantially constant (i.e. within ±1° C. per minute) are acceptable. It will be apparent, however, that equipment for this purpose which is commercially available is capable of providing even more accurately regulated heating rates.

The rate of heating which may be employed depends to a considerable extent upon the condition of the sample and the size thereof. If large samples are employed, there tends to be a significant temperature gradient within the sample itself as it is heated. This accordingly tends not only to reduce the sharpness of the desorption rate peaks as a function of temperature but also tends to distort the positions of the desorption peaks. Similar effects are noted if the sample has not been adequately comminuted which tends to create barriers to desorption. Accordingly, when large samples are used, or when samples are employed having barriers to rapid desorption, relatively slow heating rates may be preferred, i.e. in the order of 1°—5° C. per minute. On the other hand, with finely powdered samples, and particularly with very small samples such as in the order of 1 to 100 mg., the sample temperature is relatively constant, and does not deviate greatly from the temperature of the furnace. In such cases, much more rapid heating rates may be employed, typically in the order of 10°— 20° C. per minute, or even as high as 50° C./minute. For general use, a heating rate of 5°—10° C. per minute is satisfactory. Such rates considerably reduce the time required to complete an analysis. It will be evident, however, that with small samples, slow heating rates may be employed if desired.

A critical factor in the successful practice of the present invention is that the resistance offered by the reference filaments thermal conductivity cell illustrated in FIGS. 1 and 2 must be constant. It will be apparent that an inconstancy in the conditions of the reference cell will lead to an undesirable drift in the base line and may introduce spurious peaks into the desorption rate-temperature curves. In the apparatus illustrated in FIG. 1, it has been noted that the conditions in the reference cell tend to vary with the flow of gases through manifold 84. Gases flowing through the manifold tend to cause an increase in pressure at stopcock 82 and, accordingly, to increase the pressure in the cells surrounding reference filaments 74 and 76. Furthermore, the desorbed gases themselves tend to diffuse through the stopcock 82 and tube 78 and thereby contaminate the reference cells of filaments 74 and 76.

To overcome the inconstancy of the conditions in the reference cell, several expedients may be adopted. For example, it is possible after fully evacuating the apparatus and before the furnace 54 is heated to shut stopcock 82 thereby to isolate the reference cells of filaments 74 and 76. While this provides some improvement, it has been observed the inconstancy is not fully overcome. There appears to be a continuing drift in the reference cells possibly attributable to the continuing desorption of trace amounts of gases within the cell and possibly attributable to the failure of the cell to reach a truly steady-state condition. In still another alternative, the reference cells may be operated at substantially atmospheric pressure, being filled with an inert gas. While this avoids the difficulty of thermal drift and desorption of trace gases within the reference cell, this is undesirable for the reason that a large base line correction is required. Moreover, the reference cells are exceptionally sensitive to changes in room temperature when operated in this manner.

A particularly useful modification of the basic detection circuit has been discovered which overcomes these difficulties. Specifically, it has been found that if the heated filaments 74 and 76 of the reference cells are replaced in the measuring circuit by fixed resistors, there is a substantial improvement in the linearity of the response of the instrument inasmuch as the fixed resistors avoid the difficulties of drift which are inherent when using a reference cell of the thermal conductivity type under high vacuum conditions. Referring to the bridge circuit specifically illustrated in FIG. 2, for example, the reference filaments 90 and 94 are replaced by fixed resistors.

Further improvements in the foregoing process may be achieved by additional modifications of the basic apparatus. In one modification instead of using a constant current source to heat the filaments 70 and 72, a variable current source circuit is employed which maintains the filaments in the measuring cells at a constant resistance (i.e. corresponding to a constant temperature). The reference filaments 74 and 76 are not required to make this measurement. The current changes required to achieve this condition are recorded. This modification provides a significant improvement in linearity and resolution of the resulting desorption rate-temperature curves.

The apparatus and method of the present invention is applicable to the characterization of a wide variety of solid materials. Exemplary of the range of application may be mentioned:

the characterization of powdered aluminums and zincs;

the characterization of powdered lithium aluminum hydride;

the detection of lithium hydroxide in lithium carbonate and vice versa;

the detection of sulfur dioxide and other adsorbed gases on zinc oxide;

the detection of titania and silica coatings on zinc oxide;

the detection and estimation of the amounts of calcium hydroxide and calcium carbonate in a variety of calcium phosphates;

the detection of the dehydroxylation of calcium hydroxy apatite at high temperatures;

the detection of adsorbed water vapor on glass, metal and metal oxide surfaces;

the study of decomposition reactions both organic and inorganic as exemplified, for example, by the dehydration of tartaric acid;

the decomposition of lithium aluminum hydride and dehydration of aluminum hydroxide;

the detection in estimation of the amounts of aluminum hydroxide in a variety of materials;

the detection of lattice water in a variety of clays and catalyst materials;

the detection of carbon dioxide and water vapor in lead oxides; and the detection and estimation of carbon in zinc oxide through the reaction (at 900°—950° C.) of the zinc oxide with carbon to form carbon monoxide.

The utility of the method of the present invention is well illustrated by an analysis of the curve obtained by the decomposition of calcium oxalate monohydrate. Such a curve was prepared using the apparatus illustrated in FIGS. 1 and 2 with a 0.6 mg. sample. The resulting temperature-desorption rate curve is shown in FIG. 6.

A number of distinct peaks are observed. The peak at 103° C. reflects the loss of water of hydration, i.e. desorption of chemisorbed water. The peak at 488° C. is believed to be attributable to the decomposition of calcium oxalate to calcium carbonate with the evolution of carbon monoxide. The explanation for the 455° C. peak is not known. However, since it appeared in every test made using calcium oxalate, it may be attributable to an impurity. Another explanation may be that it is related to a complexity in the mechanism of carbon monoxide evolution. The 604° C. peak represents the decomposition of calcium carbonate to calcium oxide with the evolution of carbon dioxide. The location of the calcium carbonate decomposition peak was established by a separate study of an authentic sample of calcium carbonate.

The decomposition curve illustrated in FIG. 6, therefore, shows the application of the present invention to the detection of (a) the desorption of a chemisorbed gas, (b) the thermal decomposition of an organic compound, and (c) the thermal decomposition of an inorganic compound. The reaction sequence can be written as:

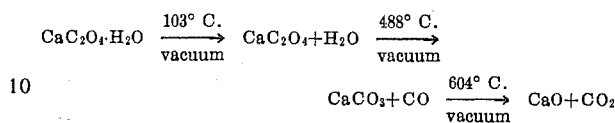

The method of the present invention may be employed also for the characterization of polymeric materials by recording their thermal decomposition curves. Very small samples, in the order of 1.0 mg., are sufficient. Each polymeric material produces a gas evolution curve having a unique profile with respect to peak height and peak location. For example, the curves of the related polymers polyethylene and polypropylene are distinctly different. Polypropylene produces more gaseous fragments and evolves them at a lower temperature than does polyethylene. This difference indicates that polyethylene possesses a greater temperature stability.

The insertion of oxygen into the polymer as in polymethylmethacrylate or epoxy resins yields a bimodal curve which may be indicative of the sequential rupture of C-O (weaker) and C-C bonds. The further addition of nitrogen as in polyurethane gives a trimodal curve.

As already mentioned, the method and apparatus of the present invention may also be applied to the characterization of liquids. Obviously, the liquids contemplated must be substantially nonvolatile under the vacuum and temperature conditions under which the above-described tests are performed. The heating of such liquids in the present apparatus can give rise to distinctive thermal decomposition curves which can provide useful information about them.

In still another embodiment of the present invention, the method and apparatus hereinabove described may be employed to analyze or characterize the surface conditions of various solids. In a preferred method of accomplishing this result, the solid whose surface is to be characterized is first heated under vacuum conditions to strip it as completely as possible of adsorbed and chemisorbed gases. Thereafter the solid is placed in an atmosphere of a known gas such as carbon dioxide, sulfur dioxide or water vapor and allowed to come to equilibrium therewith. The equilibrated sample is then placed in the apparatus described above and a temperature-desorption rate curve is measured. Because the gas used in such a desorption experiment is a known gas, the resulting curves can be interpreted in a less ambiguous manner. This technique is also useful for the identification of the desorption peaks observed when samples have previously been exposed to multicomponent gas atmosphere.

It will be understood that the foregoing embodiments of the present invention are for exemplary purposes only and that the invention is not to be restricted thereto.

I claim:

1. A method for characterizing materials which evolve gases under vacuum between the temperatures $t_1$ and $t_2$, $t_1$ being less than $t_2$ comprising the steps of:
   a. subjecting a sample of said material to a high vacuum of at least below 0.1 mm. of Hg. at a temperature of below $t_1$ for a period of time sufficient to remove substantially all of the extraneous adsorbed gases;
   b. heating said sample while it is maintained under said vacuum to a temperature above $t_2$ at a substantially constant rate, whereby gases are evolved; and
   c. measuring the rate at which gas is evolved during the heating step (b) at least once and the temperature at which the gas evolution rate is measured.

2. A method according to claim 1, wherein the sample is heated at a rate between about 1° and about 50° C. per minute.

3. A method according to claim 1, wherein the sample is heated at a rate between about 5° and 10°C. per minute.

4. A method according to claim 1, wherein said sample is evacuated in step (a) prior to heating in step (b) to a vacuum between about $10^{12}$ mm. to $10^{14}$ mm. of mercury absolute.

5. A process according to claim 1, wherein said sample is degassed for a period of time sufficient to bring the sample into substantial equilibrium with the initial temperature and vacuum conditions.

6. A method for characterizing materials which evolve gases under vacuum between the temperatures $t_1$ and $t_2$, $t_1$ being less than $t_2$ comprising the steps of:
  a. subjecting a sample of said material to a high vacuum of at least below 0.1 mm. of Hg. at a temperature of below $t_1$ for a period of time sufficient to remove substantially all of the extraneous adsorbed gases;
  b. heating said sample while it is maintained under said vacuum to a temperature above $t_2$ at a substantially constant rate whereby gases are evolved; and
  c. measuring the amount of gas evolved during the heating step (b) at least once and the temperature at which said gas evolved is measured.

7. A process according to claim 6 wherein the quantity of gas evolved is determined by measuring the gas evolution rate as a function of time over a continuous time interval and integrating the rate-time curve.

8. An apparatus for characterizing materials which evolve gases between the temperatures $t_1$ and $t_2$, $t_1$ being less than $t_2$, comprising:
  a. sample receiving means;
  b. means for heating a sample in said sample receiving means from a temperature below $t_1$ to a temperature above $t_2$ at a substantially constant predetermined rate;
  c. means for measuring the gas flow rate; and
  d. a first conduit means connecting said flow rate measuring means (c) to said sample receiving means (a) whereby gases evolved during the heating of said sample are conducted from said sample receiving means to said flow rate measuring means and second conduit means adapted to connect said flow rate measuring means (c) to a high vacuum source whereby gases evolved by desorption from said sample can be withdrawn from the flow rate measuring means.

9. An apparatus according to claim 8, wherein said means for measuring the gas flow rate comprise (i) a thermal conductivity cell having a heated filament therein and (ii) a reference resistor, said heated filament and said resistor being contained in a Wheatstone bridge circuit.

10. An apparatus according to claim 9, wherein said reference resistor is a fixed resistor.

11. An apparatus for characterizing materials which evolve gases between the temperatures $t_1$ and $t_2$, $t_1$ being less than $t_2$, comprising:
  a. sample receiving means;
  b. means for heating a sample in said sample receiving means from a temperature below $t_1$ to a temperature above $t_2$ at a substantially constant predetermined rate;
  c. means for measuring the quantity of gas evolved;
  d. a first conduit means connecting said gas measuring means (c) to said sample receiving means (a) whereby gases evolved during the heating of said sample are conducted from said sample receiving means to said gas measuring means and conduit means adapted to connect said gas measuring means (c) to a high vacuum source whereby gases evolved by desorption from said sample may be withdrawn from said gas measuring means.

12. An apparatus according to claim 11 wherein said gas measuring means comprises means for measuring gas flow rate and means for integrating the gas flow rate as a function of time.

13. A method for characterizing materials which evolve gases under vacuum between the temperature $t_1$ and $t_2$, $t_1$ being less than $t_2$ comprising the steps of:
  a. subjecting a sample of said material to a high vacuum of at least below 0.1 mm of Hg. at a temperature of below $t_1$ for a period of time sufficient to remove substantially all of the extraneous absorbed gases;
  b. heating said sample while it is maintained under said vacuum to a temperature above $t_2$ at a substantially constant predetermined rate, whereby gases are evolved; and
  c. measuring the rate at which gas is evolved as a function of temperature over a continuous time-temperature interval.

PO-1050
(5/69)

UNITED STATES PATENT OFFICE
CERTIFICATE OF CORRECTION

Patent No. 3,589,172          Dated  June 29, 1971

Inventor(s)  Robert S. Bowman

It is certified that error appears in the above-identified patent and that said Letters Patent are hereby corrected as shown below:

Column 2, line 42, and Column 7, line 5, "$10^{12}$ mm. to $10^{14}$ mm."

should be -- $10^{-2}$ mm. to $10^{-4}$ mm. --.

Signed and sealed this 4th day of January 1972.

(SEAL)
Attest:

EDWARD M. FLETCHER, JR.                ROBERT GOTTSCHALK
Attesting Officer                      Acting Commissioner of Patents